(12) United States Patent
Nandagopal et al.

(10) Patent No.: US 8,385,206 B2
(45) Date of Patent: Feb. 26, 2013

(54) SINGLE AND DUAL RATE THREE COLOR MARKER SYSTEMS

(75) Inventors: Thyagarajan Nandagopal, Edison, NJ (US); Thomas Y Woo, Short Hills, NJ (US)

(73) Assignee: Alcatel Lucent, Paris (FR)

(*) Notice: Subject to any disclaimer, the term of this patent is extended or adjusted under 35 U.S.C. 154(b) by 451 days.

(21) Appl. No.: 12/646,274

(22) Filed: Dec. 23, 2009

(65) Prior Publication Data

US 2010/0195504 A1 Aug. 5, 2010

Related U.S. Application Data

(60) Provisional application No. 61/203,929, filed on Dec. 30, 2008.

(51) Int. Cl.
*H04J 1/16* (2006.01)
(52) U.S. Cl. ...................... 370/235.1; 370/235
(58) Field of Classification Search .............. 370/229, 370/230, 230.1, 235, 232, 233, 234, 235.1, 370/236, 252, 389, 392, 395.2, 395.21, 412; 709/230, 235, 238, 224, 225, 229, 232; 455/408, 455/446
See application file for complete search history.

(56) References Cited

U.S. PATENT DOCUMENTS

| | | | |
|---|---|---|---|
| 6,868,063 B1* | 3/2005 | De Cnodder | 370/236 |
| 6,970,426 B1* | 11/2005 | Haddock | 370/235.1 |
| 7,467,223 B2* | 12/2008 | Wu et al. | 709/238 |
| 7,586,848 B1* | 9/2009 | Gunduzhan | 370/235 |
| 7,664,028 B1* | 2/2010 | Gingras et al. | 370/235 |
| 7,738,382 B2* | 6/2010 | Le Faucheur et al. | 370/235.1 |
| 2003/0223361 A1* | 12/2003 | Hussain et al. | 370/230 |
| 2004/0005896 A1* | 1/2004 | Davis et al. | 455/446 |
| 2005/0078602 A1* | 4/2005 | Mancour et al. | 370/230 |
| 2005/0135378 A1* | 6/2005 | Rabie et al. | 370/395.21 |
| 2005/0232150 A1* | 10/2005 | Nishimura | 370/230 |
| 2007/0153682 A1 | 7/2007 | Swenson et al. | |
| 2008/0219160 A1* | 9/2008 | Trinh et al. | 370/230 |
| 2008/0298243 A1* | 12/2008 | Martinotti et al. | 370/235 |

FOREIGN PATENT DOCUMENTS

DE 10 2004 024 407 A1 9/2004

OTHER PUBLICATIONS

PCT International Search Report dated Mar. 19, 2010 (PCT/US2009/069771) 4 pages.
O. Aboul-Magd et al, "A Differentiated Service Two-Rate, Three-Color Marker with Efficient Handling of in-Profile Traffic," RFC: 4115, Network Working Group, Nortel Networks, Jul. 2005, 6 pages.
J. Heinanen et al, "A Two Rate Three Color Marker," RFC: 2698, Network Working Group, University of Pennsylvania, Sep. 1999, 5 pages.
J. Heinanen et al, "A Single Rate Three Color Marker," RFC: 2697, Network Working Group, University of Pennsylvania, Sep. 1999, 6 pages.

* cited by examiner

*Primary Examiner* — Abdullah Riyami
(74) *Attorney, Agent, or Firm* — M. J. Hodulik

(57) ABSTRACT

An advance is made over the prior art in accordance with the principles of the present invention that is directed to a new approach for a system and method of Single Rate Three Color Marker (srTCM) and Two Rate Three Color Marker (trTCM) methodology. The invention eliminates deficiencies present in existing standards that allow a user to defeat the traffic meter that is used to ensure bandwidth usage is within limits imposed by the provider. Adoption of these invention will ensure compliance with the goals of an ideal Single Rate Three Color Marker (srTCM) and Two Rate Three Color Marker (trTCM) scheme.

14 Claims, 6 Drawing Sheets

REMAINING BUCKET SIZE

| PACKET SIZE | CBS | EBS | MARK COLOR |
|---|---|---|---|
|  | 100 | 10 |  |
| 55 | 45 | 10 | G |
| 50 | 45 | 10 | R |
| 45 | 0 | 10 | G |

REMAINING BUCKET SIZE

| PACKET SIZE | CBS | EBS | MARK COLOR |
|---|---|---|---|
|  | 100 | 10 |  |
| 55 | 45 | 10 | G |
| 50 | 0 | 5 | Y |
| 45 | 0 | 0 | R |

| PACKET SIZE | REMAINING TOKEN COUNT | | MARK COLOR |
|---|---|---|---|
| | Tc | Te | |
| | 100 | 110 | |
| 51 | 49 | 110 | G |
| 50 | 49 | 60 | Y |
| 25 | 24 | 60 | G |
| 25 | 24 | 35 | Y |
| 13 | 11 | 35 | G |
| 13 | 11 | 22 | Y |

| PACKET SIZE | REMAINING TOKEN COUNT | | MARK COLOR |
|---|---|---|---|
| | Tc | Te | |
| | 100 | 110 | |
| 51 | 49 | 110 | G |
| 50 | 0 | 9 | Y |
| 25 | 0 | 0 | R |
| 25 | 0 | 0 | R |
| 13 | 0 | 0 | R |
| 13 | 0 | 0 | R |

| PACKET SIZE | REMAINING TOKEN COUNT | | MARK COLOR |
|---|---|---|---|
| | Tc | Tp | |
| | 100 | 110 | |
| 51 | 49 | 110 | G |
| 50 | 49 | 60 | Y |
| 19 | 30 | 60 | G |

| PACKET SIZE | REMAINING TOKEN COUNT | | MARK COLOR |
|---|---|---|---|
| | Tc | Tp | |
| | 100 | 110 | |
| 51 | 49 | 10 | G |
| 50 | 0 | 9 | Y |
| 19 | 0 | 0 | R |

| PACKET SIZE | REMAINING TOKEN COUNT | | MARK COLOR |
| --- | --- | --- | --- |
| | Tc | Te | |
| | 100 | 20 | |
| 26 | 74 | 20 | G |
| 26 | 48 | 20 | G |
| 26 | 22 | 20 | G |
| 26 | 22 | 20 | R |

| PACKET SIZE | REMAINING TOKEN COUNT | | MARK COLOR |
| --- | --- | --- | --- |
| | Tc | Te | |
| | 100 | 20 | |
| 26 | 74 | 20 | G |
| 26 | 48 | 20 | G |
| 26 | 22 | 20 | G |
| 26 | 0 | 16 | Y |

SINGLE AND DUAL RATE THREE COLOR MARKER SYSTEMS

CROSS-REFERENCE TO RELATED APPLICATION

This application claims priority of Provisional Application Ser. No. 61/203,929 which was filed Dec. 30, 2008.

TECHNICAL FIELD

This invention relates generally to communications systems and more particularly to traffic conditioners for packet communications systems.

BACKGROUND OF THE INVENTION

RFC 2697 and RFC 2698 define a Single Rate Three Color Marker (srTCM) and Two Rate Three Color Marker (trTCM), respectively, which can be used as components in a Diffserv traffic conditioner [RFC2475, RFC2474].

A meter and a marker process each incoming packet stream. The Meter operates in one of two modes. In the Color-Blind mode, the Meter assumes that the packet stream is uncolored. In the Color-Aware mode the Meter assumes that some preceding entity has pre-colored the incoming packet stream so that each packet is either green, yellow, or red. The Marker (re)colors an IP packet according to the results of the Meter. The color is coded in the DS field (RFC 2474) of the packet in a PHB (Per-Hop Behavior) specific manner RFC 2697 provides the standard for existing solutions of the srTCM and RFC 2698 provides the standard for existing solutions of the trTCM.

SUMMARY OF THE INVENTION

An advance is made over the prior art in accordance with the principles of the present invention that is directed to a new approach for a system and method of Single Rate Three Color Marker (srTCM) and Two Rate Three Color Marker (trTCM) methodology. By adopting improved methodologies on bandwidth allocation, the present invention is able to ensure bandwidth usage is within limits imposed by the provider.

One embodiment of the invention includes a method of operating a traffic conditioner in a packet communications network. The traffic conditioner outputs a marked packet stream from an output of the traffic conditioner and includes at least one token bucket having respective first and second token counts and respective first and second token parameter sizes, wherein said token counts arc updated in accordance with at least one information rate. The method includes the steps of incrementing the first token count by one if the first token count is less than the first token parameter size and incrementing the second token count if the second token count is less than the second token parameter size. If the first token count is greater than or equal to the first parameter size then the first token count is not incremented and if said second token count is greater than or equal to the second token parameter size, then said second token count is not incremented.

When a packet of size B bytes arrives at time t, the traffic conditioner operates in a color blind mode as follows: if the first token count at time t minus B is greater than zero, the packet is colored green and both the first token count and second token count are decremented by B down to a minimum value of zero, else; if the second token count at time t minus B is greater than zero, the packet is colored yellow and both the first token count and second token count decremented by B down to a minimum value of zero, else; the packet is colored red and neither the first token count nor the second token count is decremented.

The traffic conditioner operates in a color aware mode when a packet of size B bytes arrives at time t, in accordance with the following steps: if the packet is pre-colored as green and the first token count at time t minus B is greater than zero, the packet is colored green and both the first token count and second token count are decremented by B down to a minimum value of zero, else; if the packet has been pre-colored as green or yellow and the second token count at time t minus B is greater than zero, the packet is colored yellow and both the first token count and second token count decremented by B down to a minimum value of zero, else; the packet is colored red and neither the first token count nor the second token count is decremented.

BRIEF DESCRIPTION OF THE DRAWING

The teachings of the present invention can be readily understood by considering the following detailed description in conjunction with the accompanying drawings, in which:

FIGS. 2A, 2B and 3A and 3B show marking results for exemplary packet streams inputted to the srTCM;

FIGS. 5A and 5B and 6A and 6B show marking results for exemplary packet streams inputted to the trTCM.

DETAILED DESCRIPTION

Exemplary embodiments of the invention will now he described while referring to the figures, several of which may be simultaneously referred to during the course of the following description.

SINGLE RATE THREE COLOR MARKER

Figure 1:
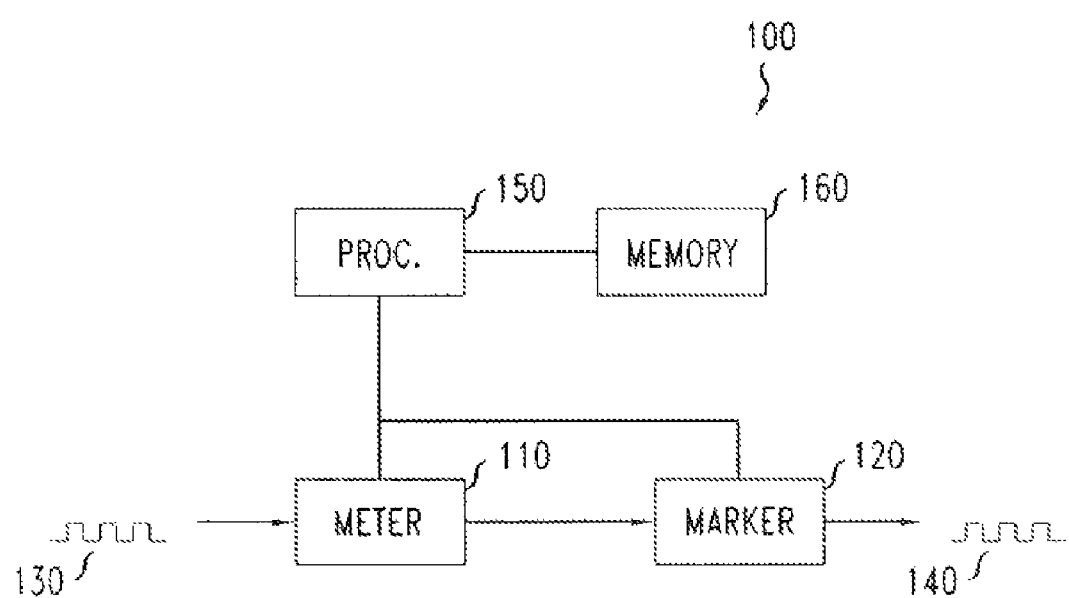
FIG. 1 shows an exemplary embodiment of a traffic conditioner for implementing the methodology of the present invention.

Referring to FIG. 1, there is shown one exemplary embodiment of a traffic conditioner 100 that includes components of a meter 110 and marker 120 for use within the traffic conditioner.

As described in the background section, the meter 110 operates in one of two modes. In a Color-Blind mode, the meter assumes that a packet stream 130 entering the traffic conditioner is uncolored. In a Color-Aware mode the meter 110 assumes that some preceding entity has pre-colored the incoming packet stream 130 so that each packet is either green, yellow, or red as the communications traffic exits in a marked packet stream 140. As would be understood by those skilled in the art, a traffic conditioner may operate in connection with a processor 150 that receives and processes instructions from memory 160 or some other source. The details of the pre-coloring process, including handling of error scenarios, and how the meter determines the color of a pre-colored packet are DS domain specific and outside the scope of this document.

The marker 120 (re)colors an IP packet according to the results of the meter 120. The color is coded in the DS field (RFC 2474) of the packet in a PHB (per hop behavior) specific manner

Configuration

The srTCM is configured by setting its mode and by assigning values to three traffic parameters: a Committed Information Rate (CIR), a Committed Burst Size (CBS), and a Peak Burst Size (PBS). The goal is to always allow traffic at or below the CIR, and to permit a maximum packet burst of size CBS without any effect on the traffic (colored green). Packet bursts exceeding CBS, but not exceeding PBS, should still be permissible, but with caveats (colored yellow). Packet bursts exceeding PBS should be flagged as exceeding the parameters of the meter (colored red).

The CIR is measured in bytes of IP packets per second, i.e., it includes the IP header, but not link specific headers. The CBS and the PBS and are measured in bytes. The CBS and PBS must be configured so that at least one of them is larger than 0. It is recommended that when the value of the CBS or the PBS is larger than 0, it is larger than or equal to the size of the largest possible IP packet in the stream.

Metering

The behavior of the meter 12 is specified in terms of its mode and two token buckets, C and E, which both share the common rate CIR. The maximum size of the token bucket C is CBS and the maximum size of the token bucket E is PBS.

The token buckets C and E are initially (at time 0) full, i.e., the token count $Tc(0)=CBS$ and the token count $Tp(0)=PBS$. Thereafter, the token counts Tc and Tp are updated CIR times per second as follows:

1. If Tc is less than CBS, Tc is incremented by one.
2. If Tp is less than PBS, Tp is incremented by one.
3. If $Tc>=CBS$ (or $Tp>=PBS$), then Tc (or Tp) is not incremented.

When a packet of size B bytes arrives at time t, the following happens if the srTCM is configured to operate in the Color-Blind mode:

1. If $Tc(t)-B>=0$, the packet is green and both Tc and Tp are decremented by B down to the minimum value of 0, else
2. if $Tp(t)-B>=0$, the packet is yellow and both Tc and Tp are decremented by B down to the minimum value of 0, else
3. the packet is red and neither Tc nor Tp is decremented.

When a packet of size B bytes arrives at time t, the following happens if the srTCM is configured to operate in the Color-Aware mode:

1. If the packet has been pre-colored as green and $Tc(t)-B>=0$, the packet is green and both Tc and Tp are decremented by B down to the minimum value of 0, else
2. If the packet has been pre-colored as green or yellow and if $Tp(t)-B>=0$, the packets is yellow and both Tc and Tp are decremented by B down to the minimum value of 0, else
3. the packet is red and neither Tc nor Tp is decremented.

Difference from Related Work

The above three algorithms (increasing counters, Color-Blind operation, Color-Aware operation) are improved from those presented in RFC 2697, and address the deficiencies found in the algorithms of the RFC. RFC 2697 refers to the PBS as Excess Burst Size (EBS). Here is why the algorithms in the RFC require improvement:

As the inventors have realized, the term EBS in RFC 2697 is not equal PBS–CBS, as the name 'Excess Burst Size' might lead one to believe. It is in fact the same as PBS. To see this, assume EBS=PBS–CBS. In RFC 2697, Tc and Te are not updated simultaneously. Tp is updated only if Tc is full (up to CBS). Given that the Te bucket size is EBS, let the initial values at time 0 for CBS and EBS be 100 and 10 bytes respectively. As illustrated in FIG. 2A, a chart 200 is shown illustrating a sequence of packets and a corresponding token count as the sequence would be processed by the prior art traffic to conditioner of RFC 2697. As shown, if a burst of three packets of size 55, 50, 45 bytes each are presented at time 0, the first packet will be colored green, the second packet will be colored red and the third packet will be colored green. Referring to FIG. 2B, a chart 210 is shown for the same sequence of packets described with respect to FIG. 2A. Here a preferred srTCM marker in accordance with the present invention will color the first packet green, second packet yellow, and the third packet as red. Thus, one can construe that RFC 2697 does consider EBS=PBS.

However, if we assume this to be the case, then both the Color-Blind and Color-Aware metering algorithms presented in RFC 2697 (referred henceforth as old-CB and old-CA algorithms) will result in a maximum burst of size (CBS+ EBS) being sent out of the meter marked green or yellow, as opposed to only a max burst of size EBS.

At time 0, for example, if a burst of size CBS+EBS was presented to the old-CB algorithm, then the first CBS bytes worth of packets will be colored green and the next EBS bytes worth of packets will be colored yellow. The same behavior is seen in the old-CA algorithm when the burst is colored green. The ideal behavior in this example is that the first CBS bytes worth of packets should be colored green, and the next (EBS– CBS) bytes worth of packets should be colored yellow, while the remaining CBS bytes worth of packets in the burst should be colored red. Our proposed algorithms (new-Updater, new-CB and new-CA) will ensure the correct behavior, as can be seen from the description of these above.

The situation can be exacerbated depending on the packet sizes and the size of the burst. FIGS. 3A and 3B show charts 300, 310 illustrated the processing of another exemplary sequence of packets utilizing, respectively, the old-CB and old-CA versus the new-CB and new-CA algorithms of the present invention. If $Tc(t)=100$, $Te(t)=110$, then let the burst, at time t, contain packets of size 51, 50, 25, 25, 13, 13, all of them colored green. The old-CB algorithm and old-CA algorithm will color these packets G, Y, G, Y, G, Y as shown by chart 300 of FIG. 3A. In accordance with the present invention, a preferred coloring for a srTCM should be G, Y, R, R, R, R as in chart 310 of FIG. 3B.

It is important to note that these differences, while subtle, can allow manipulation of traffic meters by malicious users. This can defeat the purpose of traffic metering and marking policies. Moreover, the prior art methodology has significant disadvantages when compared to the methodology of the present invention, because the order of errored packets is much different than what one would expect for a closer to ideal implementation. For instance, with respect to FIG. 3A and chart 300, one can see that a user can end up sending more packets through the system than what the system intends (by the choice of Tc and Te). In FIG. 3A chart 300, no packets will be dropped if the system was trying to drop only Red packets. If it was dropping yellow packets, three packets will get through. However, the correct quota for the user traffic burst is only two packets, if dropping only red, or one packet if dropping yellow and red.

Alternate Implementation

A different way of implementing this is to use a single bucket with two parameters: CBS and PBS. The behavior of the Meter is now specified in terms of its mode and one token bucket, C, with the rate CIR. The maximum size of the token bucket C is PBS.

TWO RATE THREE COLOR MARKER

Figure 4:
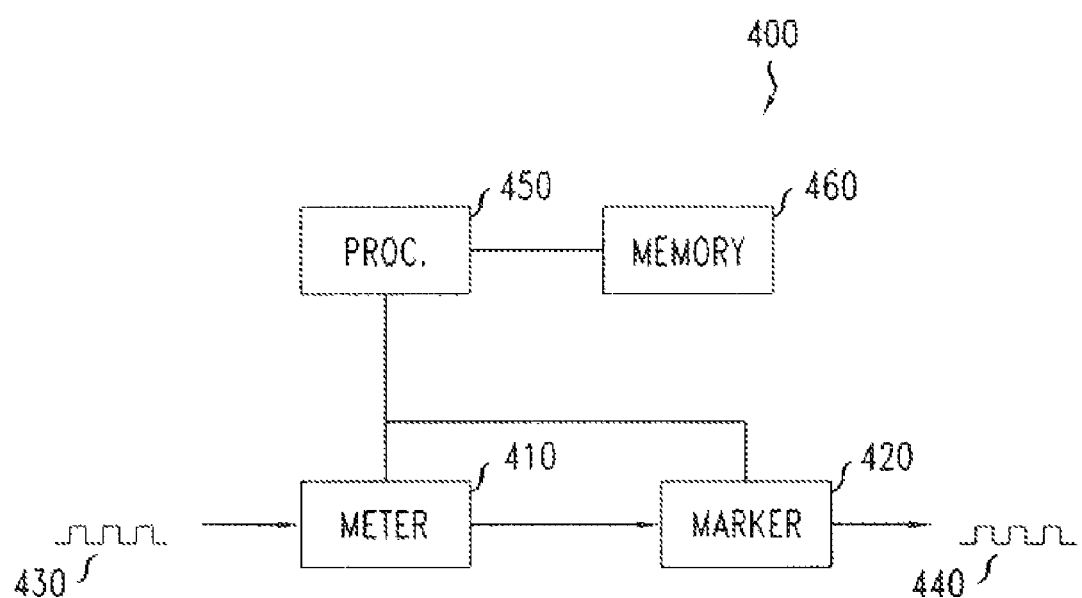
FIG. 4 shows an exemplary embodiment of a traffic conditioner for implementing the methodology of the present invention.

With respect to the Two Rate Three Color Marker, there is shown in FIG. 4, a traffic conditioner 400 having a meter 410 and a marker 420 that processes each incoming packet stream 430 in order to produce a marked packet stream 440. As with the Single Rate Three Color Marker, the Two Rate Three Color Marker traffic conditioner 400 may operate in connection with a processor 450 that receives and processes instructions from memory 460 or some other source.

The meter 410 operates in one of two modes. In the Color-Blind mode, the meter 410 assumes that the packet stream 430 is uncolored. In the Color-Aware mode the meter assumes that some preceding entity has pre-colored the incoming packet stream so that each packet is either green, yellow, or red. The details of the pre-coloring process, including handling of error scenarios, and how the meter determines the color of a pre-colored packet are DS domain specific and outside the scope of this document.

The marker 420 (re)colors an IP packet according to the results of the meter 410. The color is coded in the DS field (RFC 2474) of the packet in a PHS specific manner.

Configuration

The trTCM is configured by setting its mode and by assigning values to four traffic parameters: a Peak Information Rate (PIR) and its associated Peak Burst Size (PBS) and a Committed Information Rate (CIR) and its associated Committed Burst Size (CBS). The goal is to always allow traffic at or below the CIR, and to permit a maximum packet burst of size CBS without any effect on the traffic (colored green). Packet bursts exceeding CBS, but not exceeding PBS, should still be permissible, but with caveats (colored yellow). The same applies for traffic coming in at a rate exceeding CIR, but not exceeding PIR (colored yellow). Packet bursts exceeding PBS, and packet rates exceeding PIR should be flagged as exceeding the parameters of the meter (colored red).

The PIR and CIR are measured in bytes of IP packets per second, i.e., this includes the IP header, but not link specific headers. The PIR must be equal to or greater than the CIR. The CBS and the PBS are measured in bytes. The CBS and PBS must be configured so that both of them are larger than 0. It is recommended that when the value of the CBS or the PBS is larger than 0, it is larger than or equal to the size of the largest possible IP packet in the stream. Note that PBS>=CBS.

Metering

The behavior of the meter 410 is specified in terms of its mode and two token buckets, P and C, with rates PIR and CIR, respectively. The maximum size of the token bucket P is PBS and the maximum size of the token bucket C is CBS.

The token buckets P and C are initially (at time 0) full, i.e., the token count $Tp(0)=PBS$ and the token count $Tc(0)=CBS$. Thereafter, the token count Tp is incremented by one PIR times per second up to PBS and the token count Tc is incremented by one CIR times per second up to CBS.

When a packet of size B bytes arrives at time t, the following happens if the trTCM is configured to operate in the Color-Blind mode:

1. If $Tc(t)-B>=0$, the packet is green and both Tc and Tp are decremented by B down to the minimum value of 0, else
2. if $Tp(t)-B>=0$, the packet is yellow and both Tc and Tp is decremented by B down to the minimum value of 0, else
3. the packet is red and neither Tc nor Tp is decremented.

When a packet of size B bytes arrives at time t, the following happens if the trTCM is configured to operate in the Color-Aware mode:

1. If the packet has been pre-colored as green and $Tc(t)-B>=0$, the packet is green and both Tc and Tp are decremented by B down to the minimum value of 0, else 2. If the packet has been pre-colored as green or yellow and if $Tp(t)-B>=0$, the packets is yellow and both Tc and Tp are decremented by B down to the minimum value of 0, else
3. the packet is red and neither Tc nor Tp is decremented.

Difference from Related Work

The algorithms for Color-Blind operation and Color-Aware operation are improved from those presented in RFC 2698, and address the deficiencies found in the algorithms of the RFC. Here is why the algorithms in the RFC require improvement:

In RFC 2698, the Color-Blind and Color-Aware metering algorithms presented in RFC 2698 will be referred henceforth as old-CB and old-CA algorithms. At time 0, for example, let $Tc(t)=100$, $Tp(t)=110$, and let the burst, at time t, contains packets of size 51, 50, 19, all of them colored gem. Referring to FIGS. 5A and 5B and charts 500, 510, it can be seen that the old-CB algorithm and old-CA algorithm will color these packets G, Y, G, while in accordance with the present invention and an essentially ideal algorithm, the coloring for a trTCM should be G, Y, R. This improved behavior is replicated by the algorithms set forth in accordance with the present invention.

RFC 4115 proposes an alternative to RFC 2698, attempting to address some of the issues in the previous standard. Here, the meter is specified in terms of a committed information rate (CIR) and an excess information rate (EIR). CIR and EIR define the token generation rate of a token bucket with a size that is equal to the committed burst size (CBS) and 'excess' burst size (EBS), respectively. The EIR and EBS are related to PIR and PBS as follows: EIR=PIR−CIR, EBS=PBS−CBS.

Now, let $Tc(t)=100$, $Te(t)=20$, (ignore EIR and CIR), with a burst of 4 packets of size 26 bytes each. As shown in FIGS. 6A and 6B and charts 600, 610, the RFC 4115 algorithm colors the packets as G, G, G, R, while the algorithm in accordance with the present invention would color them as G, G, G, Y. If all these incoming packets were colored yellow, then the RFC 4115 algorithm would color them all red, but the ideal algorithm will color them all yellow. The methodology of the present invention replicates an essentially ideal algorithm behavior in all these cases.

In RFC 4115, if one interprets the EBS to be the same as PBS and EIR to be the same as PIR, then a worse problem arises, wherein the RFC 4115 algorithm will allow (i.e., color packets green or yellow) a maximum burst of PBS+CBS if presented at time 0, instead of the maximum burst of PBS. While both interpretations are possible, implementers use the former interpretation of EBS=PBS−CBS and EIR=PIR−CIR.

It is important to note that these differences, while subtle, can allow manipulation of traffic meters by malicious users. This can defeat the purpose of traffic metering and marking policies. As with the Single Rate Three Color Marker invention, the present invention is a significant improvement over the prior art, since the error order of a marked packet stream and the amount of information that is required to be retransmitted in the case of packets being dropped (colored red) may be significantly reduced.

Alternate Implementation

A different way of implementing this aspect of the present invention is to use a two token buckets, Tc and Te, with four parameters: CIR, EIR, CBS and EBS, where EIR=PIR−CIR, and EBS=PBS−CBS. The behavior of the Meter is now specified as follows:

The token buckets C and E are initially (at time 0) full; i.e., the token count $Tc(0)=CBS$ and $Te(0)=EBS$. Thereafter, the token count Tc is incremented by one CIR times per second (up to CBS), and the token count Te is incremented by one EIR times per second (up to EBS).

The Color-Aware mode is specified as follows:
1. If the packet has been pre-colored as green and Tc(t)−B>=0, the packet is green and Tc is set to max(0, Tc(t)−B), else
2. If the packet has been pre-colored as green or yellow and if Tc(t)+Te(t)−B>=0, the packet is yellow and Te is set to max(0, Te(t)−B) and Tc is set to max(0, min(Tc(t), Tc(t)−B+Te(t))), else
3. the packet is red and neither Tc nor Te is decremented.

In the Color-Blind mode of operation, all incoming packets are treated as colored green, and the above algorithm is applied. The benefit of using the EIR bucket instead of the PIR bucket is that the clock rates needed to support EIR are much slower and hence consume lower power and reduce processor load.

The foregoing description merely illustrates the principles of the invention. It will thus be appreciated that those skilled in the art will he able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Many other modifications and applications of the principles of the invention will be apparent to those skilled in the art and are contemplated by the teachings herein. Accordingly, the scope of the invention is limited only by the claims.

What is claimed is:

1. A method of operating a traffic conditioner in a packet communications network, said traffic conditioner outputting a marked packet stream from an output of said traffic conditioner, said traffic conditioner including at least one token bucket having respective first and second token counts and respective first and second token parameter sizes, wherein said token counts are updated in accordance with at least one information rate, said method comprising the steps of:
incrementing said first token count by one if said first token count is less than said first token parameter size;
incrementing said second token count if said second token count is less than said second token parameter size, wherein if said first token count is greater than or equal to the first parameter size then the first token count is not incremented and if said second token count is greater than or equal to said second token parameter size, then said second token count is not incremented; and
when a packet of size B bytes arrives at time t, the traffic conditioner operates in a color blind mode as follows:
if the first token count at time t minus B is greater than zero, the packet is colored green and both the first token count and second token count are decremented by B down to a minimum value of zero, else;
if the second token count at time t minus B is greater than zero, the packet is colored yellow and both the first token count and second token count are decremented by B down to a minimum value of zero, else;
the packet is colored red and neither the first token count nor the second token count is decremented, and when a second packet of size B bytes arrives at time t, said traffic conditioner in a color aware mode in accordance with the following steps:
if the second packet is pre-colored as green and the first token count at time t minus B is greater than zero, the second packet is colored green and both the first token count and second token count are decremented by B down to a minimum value of zero, else;
if the second packet has been pre-colored as green or yellow and the second token count at time t minus B is greater than zero, the second packet is colored yellow and both the first token count and second token count are decremented by B down to a minimum value of zero, else;
the second packet is colored red and neither the first token count nor the second token count is decremented.

2. The method of claim 1, wherein said first and second token parameters correspond to first and second token buckets.

3. The method of claim 1 wherein said at least one information rate is a Committed information rate (CIR).

4. The method of claim 3, further including a peak information rate (PIR), wherein said second token count is incremented in accordance with the peak information rate (PIR) up to said second token parameter size.

5. The method of claim 4, wherein said first and second token parameters are initially full at time t equals zero and equal to a peak bucket size (PBS) and a committed bucket size (CBS), respectively, wherein the first token count is incremented by one at the committed information rate (CIR) up to the CBS and the second token count is incremented by one at the peak information rate (PIR) up to the PBS.

6. A method of operating a traffic conditioner in a packet communications network, said traffic conditioner outputting a marked packet stream from an output of said traffic conditioner, said traffic conditioner including at least one token bucket having respective first and second token counts and respective first and second token parameter sizes, wherein said token counts are updated in accordance with at least one information rate, said method comprising the steps of:
incrementing said second token count by one if said first token count is less than said first token parameter size;
incrementing said second token count if said second token count is less than said second token parameter size, wherein if said first token count is greater than or equal to the first parameter size then the first token count is not incremented and if said second token count is greater than or equal to said second token parameter size, then said second token count is not incremented; and
when a packet of size B bytes arrives at time t, the traffic conditioner operates in a color blind mode as follows:
if the first token count at time t minus B is greater than zero, the packet is colored green and both the first token count and second token count are decremented by B down to a minimum value of zero, else;
if the second token count at time t minus B is greater than zero, the packet is colored yellow and both the first token count and second token count are decremented by B down to a minimum value of zero, else;
the packet is colored red and neither the first token count nor the second token count is decremented,
wherein said first and second token parameters correspond to first and second token buckets , and wherein said first and second token buckets correspond to token buckets C and E, respectively, each token bucket having a respective token count Tc and Te, wherein at time zero, the token count haves sizes Tc(0)=CBS (committed bucket size) and Te(0) =EBS (excess burst size) and thereafter the token count Tc is incremented by one at committed information rate (CIR) up to the CBS, and the token count Te is incremented by one at excess information rate (EIR) up to the EBS), wherein in a Color-Aware mode the traffic conditioner when receiving a second packet of size B operates as follows:

if the second packet has been pre-colored as green and Tc(t)−B>=0, the packet is green and Tc is set to max(0, Tc(t)−B); else if the second packet has been pre-colored as green or yellow and if Tc(t)+Te(t)−B>=0, the second packet is yellow and Te is set to max(0, Te(t)−B) and Tc is set to max(0, min(Tc(t), Tc(t)−B+Te(t))); else the second packet is red and neither Tc nor Te is decremented.

7. The method of claim 6, wherein in the color-blind mode of operation, all incoming packets are treated as colored green.

8. A traffic conditioner apparatus in a packet communications network, said traffic conditioner outputting a marked packet stream from an output of said traffic conditioner, said traffic conditioner including at least one token bucket having respective first and second token counts and respective first and second token parameter sizes, wherein said token counts are updated in accordance with at least one information rate, said apparatus comprising:

means for incrementing said first token count by one if said first token count is less than said first token parameter size;

means for incrementing said second token count if said second token count is less than said second token parameter size, wherein if said first token count is greater than or equal to the first parameter size then the first token count is not incremented and if said second token count is greater than or equal to said second token parameter size, then said second token count is not incremented; and when a packet of size B bytes arrives at time t, the traffic conditioner operates in a color blind mode as follows:

if the first token count at time t minus B is greater than zero, the packet is colored green and both the first token count and second token count are decremented by B down to a minimum value of zero, else;

if the second token count at time t minus B is greater than zero, the packet is colored yellow and both the first token count and second token count are decremented by B down to a minimum value of zero, else;

the packet is colored red and neither the first token count nor the second token count is decremented, and when a second packet of size B bytes arrives at time t, said traffic conditioner operates in a color aware mode in accordance with the following steps:

if the second packet is pre-colored as green and the first token count at time t minus B is greater than zero, the second packet is colored green and both the first token count and second token count are decremented by B down to a minimum value of zero, else;

if the second packet has been pre-colored as green or yellow and the second token count at time t minus B is greater than zero, the second packet is colored yellow and both the first token count and second token count are decremented by B down to a minimum value of zero, else;

the second packet is colored red and neither the first token count nor the second token count is decremented.

9. The apparatus of claim 8, wherein said first and second token parameters correspond to first and second token buckets.

10. The apparatus of claim 8, wherein said at least one information rate is a committed information rate (CIR).

11. apparatus of claim 10, further including a peak information rate (PIR), wherein said second token count is incremented in accordance with the peak information rate (PIR) up to said second token parameter size.

12. The apparatus of claim 11, wherein said first and second token parameters are initially full at time t equals zero and equal to a peak bucket size (PBS) and a committed bucket size (CBS), respectively, wherein the first token count is incremented by one at the committed information rate (CIR) up to the CBS and the second token count is incremented by one at the peak information rate (PIR) up to the PBS.

13. A traffic conditioner apparatus in a packet communications network, said traffic conditioner outputting a marked packet stream from an output of said traffic conditioner, said traffic conditioner including at least one token bucket having respective first and second token counts and respective first and second token parameter sizes, wherein said token counts are updated in accordance with at least one information rate, said apparatus comprising:

means for incrementing said first token count by one if said first token count is less than said first token parameter size;

means for incrementing said second token count if said second token count is less than said second token parameter size, wherein if said first token count is greater than or equal to the first parameter size then the first token count is not incremented and if said second token count is greater than or equal to said second token parameter size, then said second token count is not incremented; and when a packet of size B bytes arrives at time t, the traffic conditioner operates in a color blind mode as follows:

if the first token count at time t minus B is greater than zero, the packet is colored green and both the first token count and second token count are decremented by B down to a minimum value of zero, else;

if the second token count at time t minus B is greater than zero, the packet is colored yellow and both the first token count and second token count are decremented by B down to a minimum value of zero, else;

the packet is colored red and neither the first token count nor the second token count is decremented, wherein said first and second token parameters correspond to first and second token buckets, and wherein said first and second token buckets correspond to token buckets C and E, respectively, each token bucket having a respective token count Tc and Te, wherein at time zero, the token count haves sizes Tc(0)=CBS (committed bucket size) and Te(0)=EBS (excess burst size) and thereafter the token count Tc is incremented by one at committed information rate (CIR) up to the CBS, and the token count Te is incremented by one at excess information rate (EIR) up to the EBS), wherein in a Color-Aware mode the traffic conditioner when receiving a second packet of size B operates as follows:

if the second packet has been pre-colored as green and Tc(t)−B>=0, the packet is green and Tc is set to max(0, Tc(t)−B); else if the second packet has been pre-colored as green or yellow and if Tc(t)+Te(t)−B>=0, the second packet is yellow and Te is set to max(0, Te(t)−B) and Tc is set to max(0, min(Tc(t), (Tc(t)−B+Te(t)))); else the second packet is red and neither Tc nor Te is decremented.

14. The apparatus of claim 13, wherein in a the color-blind mode of operation, all incoming packets are treated as colored green.

\* \* \* \* \*